United States Patent
Kawamoto et al.

(10) Patent No.: US 7,851,068 B2
(45) Date of Patent: Dec. 14, 2010

(54) OPTICAL COMPENSATION FILM AND DISPLAY ELEMENT USING THE SAME

(75) Inventors: Satoshi Kawamoto, Ichihara (JP); Masumi Saruwatari, Nagoya (JP)

(73) Assignee: Mitsui Chemicals, Inc., Tokyo (JP)

( * ) Notice: Subject to any disclaimer, the term of this patent is extended or adjusted under 35 U.S.C. 154(b) by 877 days.

(21) Appl. No.: 11/663,649

(22) PCT Filed: Sep. 22, 2005

(86) PCT No.: PCT/JP2005/017529

§ 371 (c)(1),
(2), (4) Date: May 18, 2007

(87) PCT Pub. No.: WO2006/033414

PCT Pub. Date: Mar. 30, 2006

(65) Prior Publication Data

US 2008/0145680 A1    Jun. 19, 2008

(30) Foreign Application Priority Data

Sep. 24, 2004   (JP) .............................. 2004-277730

(51) Int. Cl.
- *B32B 27/00* (2006.01)
- *C09K 19/00* (2006.01)
- *G02F 1/1335* (2006.01)

(52) U.S. Cl. ...................... 428/500; 428/1.33; 349/117; 349/118

(58) Field of Classification Search ....................... None
See application file for complete search history.

(56) References Cited

U.S. PATENT DOCUMENTS 7,345,725 B2 *  3/2008  Umeda et al. ............... 349/118

FOREIGN PATENT DOCUMENTS

| | | |
|---|---|---|
| EP | 1 278 079 A1 | 1/2003 |
| JP | 08-075921 | 3/1996 |
| JP | 2001-194668 | 7/2001 |
| JP | 2001-215332 | 8/2001 |
| JP | 2003-327800 | 11/2003 |
| JP | 2004-004905 | 1/2004 |
| JP | 2004-118185 | 4/2004 |
| JP | 2004-151573 | 5/2004 |
| JP | 2004-177642 | 6/2004 |
| JP | 2004-240181 | 8/2004 |
| WO | WO 03/056365 A2 | 7/2003 |

* cited by examiner

*Primary Examiner*—Sheeba Ahmed
(74) *Attorney, Agent, or Firm*—Foley & Lardner LLP

(57) ABSTRACT

In an optical compensation film, when a direction that gives the maximum in-plane refractive index is X axis, an in-plane direction perpendicular to X axis is Y axis, a film thickness direction is Z axis, refractive indexes at the wavelength of 590 nm in each axis direction are $n_X$, $n_Y$, and $n_Z$ respectively, and the film thickness is d, an in-plane retardation value defined as $R=(n_X-n_Y)\cdot d$ and a thickness direction retardation value defined as $Rth=|(n_X+n_Y)/2-n_Z|\cdot d$, both of which are measured under conditions at 23 degrees centigrade and a relative humidity of 50%, satisfy the inequalities of $Rth/R \geqq 5$ and $R \leqq 9.5$ (nm).

23 Claims, 1 Drawing Sheet

OPTICAL COMPENSATION FILM AND DISPLAY ELEMENT USING THE SAME

TECHNICAL FIELD

The present invention relates to an optical compensation film having a specific birefringence, a method for compensating a viewing angle using such a film and various display elements using such films.

BACKGROUND ART

In order to achieve a display which may be easily noticeable having a high contrast ratio in a wide viewing angle for a liquid crystal display device and the like, an optical film wherein refractive indexes within the surface of the optical film $n_x$, $n_y$, a thickness direction refractive index $n_z$ and a film thickness d are optimized has been used.

A phase difference layer with no phase difference or very little phase difference within the surface and having a phase difference only in a thickness direction is called a C-plate. C-plate is called a negative C-plate when its conditions of optical properties satisfy an inequality of $n_x \approx n_y > n_z$, while it is called a positive C-plate when its conditions of optical properties satisfy an inequality of $n_z > n_x \approx n_y$. Typical examples of the negative C-plate include a biaxially stretched polycarbonate (PC) or polyethylene terephthalate (PET) film, a film in which a selective reflection wavelength region of a cholesteric liquid crystal is set shorter than a visible ray, a film with a discotic liquid crystal oriented parallel to the surface, a film obtained by vertically aligning an inorganic crystalline compound having a negative birefringence and the like. Typical examples of the positive C-plate include vertically aligned liquid crystal films as disclosed, for example, in Patent Documents 1 and 2.

The phase difference within the surface of C-plate may be as small as possible from the viewpoint of maintenance of the polarization state of an incident light from the Z axis direction (normal direction) as it is, and it is preferably not more than λ/20, more preferably not more than λ/50 and ideally 0. However, since in the biaxially stretched polycarbonate (PC) or polyethylene terephthalate (PET) film, a photo-elastic coefficient was big (a phase difference caused by stretching orientation is easily exhibited), a big phase difference was exhibited due to a little stretching difference in the X and Y directions. Thus, it was difficult to diminish the phase difference within the surface. Furthermore, when a liquid crystal or an inorganic crystalline compound oriented to a base film or the like was used, it was possible to reduce the phase difference within the surface in some cases, whereas there was a problem of high cost because the number of materials and the number of processes were high.

Meanwhile, there have been disclosed a film using triacetyl cellulose, a cyclic olefin based polymer or the like in Patent Documents 3 and 4. In the production of these films, a so-called solution casting method including melting a resin in a solution to form a film has been used. For this reason, these films were also expensive because the number of materials and the number of processes were high, and sufficient considerations have been required for handling such films because a flammable solvent was used.

Patent Document 1: Japanese Patent Laid-open No. 2001-194668

Patent Document 2: Japanese Patent Laid-open No. 2004-118185

Patent Document 3: Japanese Patent Laid-open No. 2004-4905

Patent Document 4: Japanese Patent Laid-open No. 2004-177642

DISCLOSURE OF THE INVENTION

That is, the present invention provides an optical compensation film obtainable according to a melting method, wherein, when a direction that gives the maximum in-plane refractive index is X axis, an in-plane direction perpendicular to X axis is Y axis, a film thickness direction is a Z axis, refractive indexes at the wavelength of 590 nm in each axis direction are $n_X$, $n_Y$, and $n_Z$ respectively, and the film thickness is d, an in-plane retardation value defined as $R=(n_X-n_Y) \cdot d$ and a thickness direction retardation value defined as $Rth=|(n_X+n_Y)/2-n_Z| \cdot d$, both of which are measured under conditions at 23 degrees centigrade and a relative humidity of 50%, satisfy the inequalities of $Rth/R \geq 5$ and $R \leq 9.5$ (nm).

Further, the present invention provides an optical compensation film containing an alicyclic structure-containing polymer, wherein, when a direction that gives the maximum in-plane refractive index is X axis, an in-plane direction perpendicular to X axis is Y axis, a film thickness direction is a Z axis, refractive indexes at the wavelength of 590 nm in each axis direction are $n_X$, $n_Y$, and $n_Z$ respectively, and the film thickness is d, an in-plane retardation value defined as $R=(n_X-n_Y) \cdot d$ and a thickness direction retardation value defined as $Rth=|(n_X+n_Y)/2-n_Z| \cdot d$, both of which are measured under conditions at 23 degrees centigrade and a relative humidity of 50%, satisfy the inequalities of $Rth/R \geq 5$ and $R \leq 7.5$ (nm).

Furthermore, a method for compensating a viewing angle that is one embodiment of the present invention includes using any of films as described above.

Further, a display element that is one embodiment of the present invention is made up by using any of films as described above.

Further, a liquid crystal display element that is one embodiment of the present invention is made up by using any of films as described above.

According to the present invention, since it is possible to hardly affect the phase difference within the surface and offset the phase difference in a thickness direction, it is possible to effectively compensate a viewing angle of a display surface in a display device and enhance the viewing angle.

BRIEF DESCRIPTION OF THE DRAWINGS

The aforementioned objects and other objects, characteristics and advantages become further clear by the appropriate embodiments to be described below and the following drawings accompanied thereto.

BEST MODE FOR CARRYING OUT THE INVENTION

Figure 1:
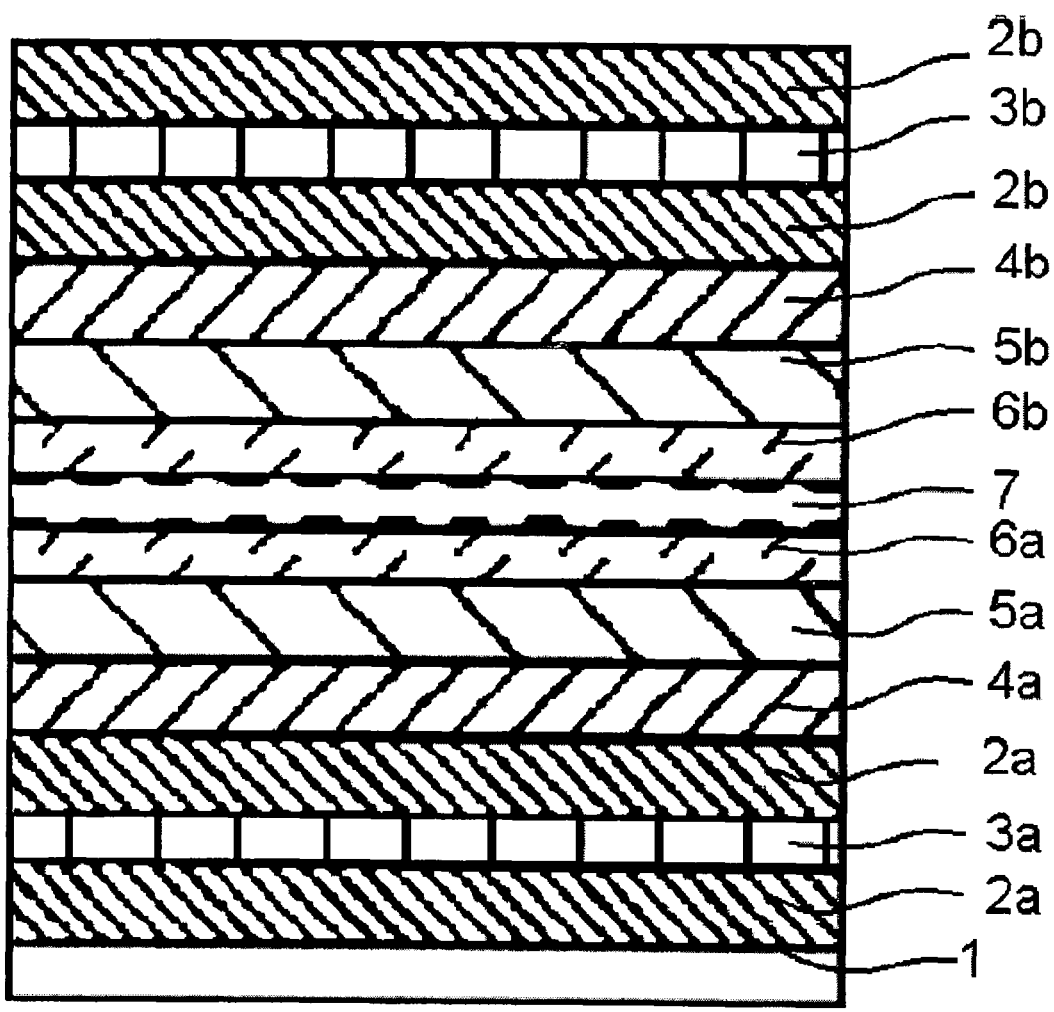
FIG. 1 is a cross-sectional schematic view illustrating an example of a liquid crystal display device with the optical compensation film according to the present invention applied thereto.

Birefringence of a Film of a Resin

The film of the present invention is a film, wherein, when a direction that gives the maximum in-plane refractive index is X axis, an in-plane direction perpendicular to X axis is Y axis, a film thickness direction is Z axis, refractive indexes at the wavelength of 590 nm in each axis direction are $n_X$, $n_Y$, and $n_Z$ respectively, and the film thickness is d, an in-plane retardation value defined as $R=(n_X-n_Y)\cdot d$ and a thickness direction retardation value defined as $Rth=1\ (n_X+n_Y)/2-n_Z|\cdot d$, both of which are measured under conditions at 23 degrees centigrade and a relative humidity of 50%, satisfy the inequalities of $Rth/R \geq 5$ and $R \leq 9.5$ (nm). Here, $n_X$, $n_Y$ and $n_Z$ can be obtained by computer calculation from the following equations (1) to (5) using the retardation value within the surface (R), the retardation value ($R_{40}$) measured by the slant of 40 degrees of a slow axis as an inclined axis, the film thickness (d) and the average refractive index ($n_0$) of the film.

$$R=(n_X-n_Y)\times d \quad (1)$$

$$R_{40}=(n_X-n_Y')\times d/\cos(\phi) \quad (2)$$

$$(n_X+n_Y+n_Z)/3=n_0 \quad (3)$$

$$\phi=\sin^{-1}[\sin(40°)/n_0] \quad (4)$$

$$n_Y'=n_Y\times n_Z/[n_Y^2\times\sin^2(\phi)+n_Z^2\times\cos^2(\phi)]^{1/2} \quad (5)$$

wherein, in the above equations, $n_Y'$ refers to a refractive index in the direction of Y' axis when a light axis of an incident light with a light at 590 nm incident on the film at an incident angle of 40 degrees is a Z' axis, an inclined axis of the film is a X' axis, and an axis vertical to the Z' axis and X' axis is a Y' axis; and $\phi$ refers to a refractive angle when a light at 590 nm is incident on the film at an incident angle of 40 degrees.

When R is not more than 9.5 nm, an effect of the phase difference within the surface can be substantially neglected in many cases. So, a film can be used by paying attention only to the thickness direction phase difference. When Rth/R is 5 or more, an effect of adjusting the thickness direction phase difference is sufficiently great so that such a film can be used as a practically excellent C-plate. As described above, since a film satisfying inequalities of $Rth/R \geq 5$ and $R \leq 9.5$ (nm) is used as a C-plate for adjusting the thickness direction phase difference, such a film is a suitable optical compensation film.

R is preferably not more than 9.5 nm, more preferably not more than 8 nm, further preferably not more than 7.5 nm, particularly preferably not more than 5 nm and particularly not more than 1 nm. In particular, R is preferably not more than 9.5 nm from the viewpoint that an effect of improvement of a viewing angle is stably obtained by preparing a film according to a melting method, while R is preferably not more than 7.5 nm from the viewpoint that a much higher effect is required. R is preferable as small as possible. There is no particular lower limit in the R value. However, it is difficult to measure R of not more than 0.1 nm in the current analysis method.

Rth is usually not less than 10 nm, preferably not less than 20 nm and further preferably not less than 50 nm. Rth is preferable as high as possible. There is no particular upper limit in the Rth value, but Rth of an optical compensation film for adjusting a phase difference is usually not more than 550 nm considering that an effect equivalent to those with a phase difference of $\alpha$ nm and $\alpha+n\lambda$ (n is an integer; $\lambda$ is a wavelength for adjustment (usually about 550 nm)) nm in view of performance is obtained. Rth/R is preferably not less than 8 and further preferably not less than 10. Rth/R is preferable as high as possible. There is no particular upper limit in the Rth/R value, but it is usually not more than 500.

Meanwhile, the retardation depends on a film thickness of a film and the retardation per a unit film thickness R/d is preferably not more than $2.5\times10^{-4}$ and further preferably not more than $2.0\times10^{-4}$, while Rth/d is preferably not less than $1.0\times10^{-4}$ and further preferably not less than $2.5\times10^{-4}$.

When R/d is within the above range, it is easy to achieve a suitable R in a film having a practically suitable film thickness. Such R/d is preferable. When R/d is too high, in order to achieve a suitable R, the film thickness of the film must be small. So, the strength of the film might be decreased or it might be difficult to form a film.

Further, when Rth/d is within the above range, it is easy to achieve a suitable Rth in a film having a practically appropriate film thickness. Such Rth is preferable. When Rth/d is too small, in order to achieve a suitable Rth, the film thickness of the film must be thick. So, the light transmission of the film might be decreased, the amount of the resin used might increase, or the film might occupy excessive space in a display element and the like.

(Method for Forming a Film)

In the production of the film of the present invention, a melting method including melting a resin for molding, a solution casting method including dissolving a resin in a solvent for casting to form a film and the like can be used. However, since a solvent is not used, a melting method capable of effectively reducing the content of the volatile component in the film is preferably used. It is preferable to use the melting method because it is cheap as compared to the solution casting method and the like, its production speed is fast, and its load to the environment is low without using any solvent. Examples of the melting method include a melt extrusion method such as a method using T-die and inflation method, a calendering method, a heat-pressing method, and an injection molding method. Of these methods, the melt extrusion method using T-die is preferably used since non-uniformity in thickness can be diminished, it is easy to process a film at a film thickness of from about 20 to 500 μm, and the absolute value of the retardation and its variation can be small.

Conditions of the melt molding method are almost the same as those used for a polycarbonate resin having a Tg of the same degree. For example, in the melt extrusion method using T-die, conditions for slowly cooling the resin are preferably selected at the resin temperature of from about 240 to 300 degrees centigrade and temperature of take-off rolls of relatively high temperature of from about 100 to 150 degrees centigrade. Further, in order to decrease defects on the surface of a die line or the like, a die needs to have a structure such that a residual part becomes very small and those with almost no scratch inside the die or lip or the like are preferably used. Further, the inside of the die or lip is subjected to surface grinding as needed, whereby the surface accuracy can be further enhanced.

In the production of the film of the present invention, the film prepared by the above melting method may be used without stretching, or may be stretched either uniaxially or biaxially. The thickness direction retardation Rth can be increased by stretching and accordingly properly adjusted. At this time, it is preferable to adopt a material capable of maintaining a small retardation R within the surface.

Furthermore, the optical compensation film of the present invention may satisfy the above conditions of the retardation as a film. Its film thickness is not particularly limited, but it is preferable that the film before stretching has a film thickness of from about 50 to 500 μm. Finally, the film thickness after stretching is usually from 10 to 200 μm, preferably from 15 to 150 μm and further preferably from 20 to 100 μm. When the film thickness is too small, it is difficult to give a sufficient mechanical strength to the film. On the other hand, when it is too high, the optical loss and the amount of resin used are hardly suppressed, and when the film is used for a display element, it is difficult to save the space. By having the film thickness within the above range, an optical compensation film with excellent balance of both characteristics is obtained.

On the other hand, the non-uniformity in thickness is preferably as low as possible. It is within ±8%, preferably within ±6% and more preferably within ±4% of the whole surface. When the non-uniformity in thickness of the sheet is great, a variation of retardations in a stretch-oriented film might be great.

The stretch-oriented film that is one of preferred embodiments of the present invention is obtained by stretching a sheet uniaxially or biaxially. Molecules are oriented by stretching, whereby the retardation can be controlled. A stretch ratio is usually from 1.3 to 10 times and preferably from 1.5 to 8 times. In this range, a prescribed retardation may be arranged. When the stretch ratio is too low, the absolute value of the retardation does not increase, thereby hardly reaching a prescribed value in some cases. When it is too high, the sheet might be broken in some cases. Stretching is usually carried out in a temperature range of from Tg of the resin constituting the sheet to Tg+50 degrees centigrade, and preferably from Tg to Tg+40 degrees centigrade. When the stretching temperature is too low, the sheet might be broken. When it is too high, molecules are not oriented. So, a desired retardation might not be obtained.

(Water Absorption of a Resin)

The film of the present invention is preferably composed of a resin with a water absorption of not more than 0.1%. Here, [is composed of] means both a case where the whole film of the present invention is composed of the resin and a case where a part of the film of the present invention is composed of the resin. The content of the resin with a water absorption of not more than 0.1% in the film is not particularly limited, but it is generally from 50 to 100 weight %, preferably from 60 to 100 weight % and further preferably from 70 to 100 weight %.

The water absorption of a resin is measured in accordance with the JIS K7209 method. At first, a sample is dried at a blower type dryer set to 50 degrees centigrade for 24 hours and cooled down to room temperature in a desiccator. The resulting sample is weighed (W1), immersed in pure water in an atmosphere of 25 degrees centigrade for 24 hours, and then water is thoroughly wiped out with a dustcloth. The sample is weighed (W2). The water absorption can be obtained from these weights W1 and W2 according to the following equation.

Water absorption (%)=(W2−W1)/W1×100

Incidentally, measurement is carried out with the number of samples n=3 and an arithmetic average is taken as a water absorption of the resin. When the water absorption of the resin is not more than 0.1%, it is preferable because deformation of the film or change in optical properties affected by absorption can be suppressed. The water absorption of the resin is preferably not more than 0.1%, further preferably not more than 0.08% and particularly preferably not more than 0.06%. When the water absorption is within the range, an effect of improvement of a viewing angle can be stably achieved. Incidentally, the water absorption of a resin is preferable as low as possible. There is no particular lower limit in the water absorption, but it is difficult to measure the water absorption of not more than 0.01% in consideration of the accuracy in the current measurement method.

The kind of resin with a water absorption of not more than 0.1% is not particularly limited, but preferably used are an alicyclic structure-containing polymer such as a norbornene type resin and the like, polyethylene, polypropylene, poly-4-methylpentene-1 and the like. Of these, particularly preferred is the alicyclic structure-containing polymer because it has a low water absorption, and many of the polymers are also excellent in dimensional stability, transparency and the like.

Furthermore, in the application of the optical compensation film, it is preferable that a correlation between a relative humidity and a birefringence index of the film at room temperature is not exhibited. For example, a maximum change in the R and Rth values at each relative humidity is demanded to be within 10%. For examples, when an R value and an Rth value at a relative humidity of 30% are respectively taken as $R_1$, and $Rth_1$, and those at a relative humidity of 50% are respectively taken as $R_2$ and $Rth_2$, it is preferable that $Rth_2/Rth_1$ and $R_2/R_1$ satisfy one of the following inequalities.

$$0.9 \leq Rth_2/Rth_1 \leq 1.1 \text{ or } 0.9 \leq R_2/R_1 \leq 1.1$$

(Photo-Elastic Coefficient)

In a resin constituting at least a part of the film of the present invention, the photo-elastic coefficient is demanded to be preferably not more than $1.0 \times 10^{-9}$ $Pa^{-1}$. The photo-elastic coefficient is further preferably not more than $0.8 \times 10^{-9}$ $Pa^{-1}$, and particularly preferably not more than $0.5 \times 10^{-9}$ $Pa^{-1}$.

When the photo-elastic coefficient is not more than $1.0 \times 10^{-9}$ $Pa^{-1}$, a stress is applied to the film upon melt molding according to a melt extrusion method or the like, upon stretching of a film or other processing steps, birefringence hardly occurs. Therefore, such a coefficient is preferable from the viewpoint that the birefringence within the film surface is suppressed. That is, it is possible to more easily produce the film of the present invention by using the resin having a photo-elastic coefficient of not more than $1.0 \times 10^{-9}$ $Pa^{-1}$.

The photo-elastic coefficient can be calculated using a rheometer by setting a temperature to a temperature range of the glass transition temperature to (this glass transition temperature+20) degrees centigrade, changing the load and irradiating a laser beam at a wavelength of 633 nm of the film for measuring the change of birefringence to the change of load applied to the film. In addition thereto, for example, using an ellipsometer, the cast film having a film thickness of 100 μm is irradiated with a laser beam at a wavelength of 633 nm for measuring the change of birefringence to the change of load applied to the film, whereby the photo-elastic coefficient can also be calculated.

More concretely, the photo-elastic coefficient can be measured by using a dynamic birefringence measuring equipment with a sample piece having a thickness of 1 mm. Details on the measurement conditions can be set to conditions as described in Journal of The Society of Rheology, Japan, Vol. 19, p. 93 (1991).

There is no particular lower limit in the value of photo-elastic coefficient. However, it is difficult to accurately evaluate a resin with a photo-elastic coefficient of less than $1.0 \times 10^{-13}$ $Pa^{-1}$ from the limit of measurement in the current measurement method.

The photo-elastic coefficient can be properly increased or decreased by controlling a chemical structure of the resin constituting the film of the present invention. A guideline on the adjustment of the photo-elastic coefficient according to a chemical structure is different depending on a material system. For example, the following guideline can be applied to a cyclic olefin (co)polymer which can be preferably used in the present invention. The skilled persons in the art are able to obtain a guideline for adjusting the photo-elastic coefficient in a material system other than the cyclic olefin (co)polymer with reference to the following guideline.

In the cyclic olefin (co)polymer, for example, it is possible to increase the photo-elastic coefficient by introducing an atom or an atomic group having a high polarizability into its main chain. On the other hand, it is possible to decrease the photo-elastic coefficient by eliminating such an atom or an atomic group from the main chain. Examples of the atom or atomic group having a high polarizability include S, O and the like, while examples of the atom or atomic group having a small polarizability include $CH_2$, NH and the like. Accordingly, it is possible to decrease the photo-elastic coefficient, for example, by eliminating S or O from the main chain and introducing $CH_2$ thereinto.

Furthermore, in the cyclic olefin (co)polymer, it is possible to increase the photo-elastic coefficient by introducing an atom or an atomic group having a small polarizability into its side chain, while it is possible to decrease the photo-elastic coefficient by eliminating such an atom or an atomic group from the side chain. Accordingly, it is possible to decrease the photo-elastic coefficient, for example, by eliminating $CH_2$ from the side chain and introducing S or O thereinto.

Meanwhile, the photo-elastic coefficient is a physical quantity which is increased along with the increase of the refractive index. Accordingly, it is possible to increase the photo-elastic coefficient by introducing an atom or an atomic group which greatly contributes to the refractive index, while it is possible to decrease the photo-elastic coefficient by eliminating such an atom or an atomic group.

The contribution to the refractive index can be estimated from, for example, a molecular volume, a molecular refraction or the like. In accordance with such an estimation, $O<C=O<CH_2<NH<S$ are greatly contributing to the refractive index in that order. Thus, the photo-elastic coefficient can be reduced by introducing O, CO and the like into a polymer and eliminating NH, S and the like.

Furthermore, in the optical compensation film of the present invention, it is preferable that the photo-elastic coefficient $\beta$ ($Pa^{-1}$) of the resin constituting at least a part of the optical compensation film and the weight loss L (%) when the above film is heated from 30 to 200 degrees centigrade and kept at 200 degrees centigrade for 1 hour satisfy the following inequality.

$$\beta \times 2.5 \times 10^5 + L \times 2.5 \times 10^{-4} \leq 1 \times 10^{-3} \quad \text{(Formula 1)}$$

Incidentally, the weight loss L is a value calculated by deducing the weight measured after the resin is heated to 200 degrees centigrade and kept at 200 degrees centigrade for 1 hour from the value before temperature elevation.

An optical compensation film having high weight loss L (%) is apt to easily make the retardation unstable. As a result, the contrast or color tone of a display element using such an optical compensation film might be deteriorated with time. Here, when the conditions in Expression 1 are satisfied by properly adjusting the photo-elastic coefficient of the resin, the retardation of the optical compensation film becomes relatively stable so that the contrast or color tone of a display element can be made stable over a long period of time. Therefore, it is preferable. The photo-elastic coefficient can be properly adjusted by the method as described, but it is preferably a value satisfying the Expression 1 and belongs to the aforementioned range.

It is demanded that the photo-elastic coefficient $\beta$ ($Pa^{-1}$) and the weight loss L (%) preferably satisfy the conditions in Expression 2 and further preferably satisfy those in Expression 3.

$$\beta \times 2.5 \times 10^5 + L \times 2.5 \times 10^{-4} \leq 8.0 \times 10^{-4} \quad \text{(Formula 2)}$$

$$\beta \times 2.5 \times 10^5 + L \times 2.5 \times 10^{-4} \leq 6.0 \times 10^{-4} \quad \text{(Formula 3)}$$

There is no particular lower limit in the above conditions. However, it is difficult to accurately evaluate those with the left-hand side of less than $2.5 \times 10^{-8}$ from the limit of measurement method in the current measurement method.

Further, when a film with the left-hand side which is extremely small is produced and selected, the cost might be increased in some cases. Accordingly, the left-hand side in any inequality of Expressions 1 to 3 is preferably not less than $1 \times 10^{-7}$, and more preferably not less than $1 \times 10^{-6}$ from the viewpoint of cost.

(Glass Transition Temperature)

It is required that the resin constituting at least a part of the film of the present invention has a glass transition temperature (Tg) of not less than 100 degrees centigrade. Tg is further preferably not less than 120 degrees centigrade and particularly preferably not less than 140 degrees centigrade.

When Tg is not less than 100 degrees centigrade, depending on a temperature in a manufacturing process of various liquid crystal display devices (so-called process temperature) and a temperature when various display devices are used (actually used temperature), there are favorable effects such that a phase difference within a surface and in a thickness direction hardly changes and the like. Tg can be measured in a heating rate of 10 degrees centigrade/minute by using a nitrogen gas as an atmosphere gas according to the differential scanning calorimetry (DSC) in accordance with the JIS K7121 method.

There is no particular upper limit for Tg in the film of the present invention. However, Tg is usually not more than 500 degrees centigrade, preferably not more than 400 degrees centigrade and further preferably not more than 300 degrees centigrade from the viewpoints that a temperature necessary for stretching does not become high, the flexibility of the film is secured, breakage is controlled and the like.

(Alicyclic Structure-Containing Polymer)

The film of the present invention is preferably composed of an alicyclic structure-containing polymer. Here, [is composed of] means both a case where the whole film is composed of the alicyclic structure-containing polymer and a case where a part of the film is composed of the alicyclic structure-containing polymer. The content of the alicyclic structure-containing polymer is not particularly limited, but it is generally from 50 to 100 weight %, preferably from 60 to 100 weight % and further preferably from 70 to 100 weight % from the viewpoint of the optical homogeneity and the like. Further, other components in addition to the resin are not particularly limited, but for example, an olefin based elastomer or a styrene based elastomer can be added from the viewpoint of improvement of impact resistance and the like. As described below, other various additives may be used.

The alicyclic structure-containing polymer contains an alicyclic structure in the repeating unit of the polymer and may have the alicyclic structure at any of its main chain or side chain. Examples of the alicyclic structure include a cycloalkane structure and a cycloalkene structure, but the cycloalkane structure is preferred from the aspect of thermal stability and the like. The number of carbon atoms forming the alicyclic structure is not particularly limited. However, when it is generally in the range of 4 to 30 carbon atoms, preferably in the range of 5 to 20 carbon atoms and more preferably 5 to 15 carbon atoms, a film which is excellent in heat resistance and flexibility is obtained. A proportion of the repeating unit having the alicyclic structure in the alicyclic structure-containing polymer may be suitably selected as necessary for the intended application. However, it is generally not less than 20 weight %, preferably not less than 40 weight %, and more preferably not less than 60 weight %. If the proportion of the repeating unit having the alicyclic structure in the alicyclic structure-containing polymer is too low, the heat resistance becomes deteriorated. Therefore, such a proportion is not preferable. Incidentally, other repeating units than the repeating unit having the alicyclic structure in the alicyclic structure-containing polymer are not particularly limited, and they are suitably selected as necessary for the intended application.

Specific examples of the polymer resin containing an alicyclic structure include (1) norbornene type polymers, (2) monocyclic cycloolefin based polymers, (3) cyclic conjugated diene type polymers, (4) vinyl alicyclic hydrocarbon polymers, hydrogenated products thereof and the like. Among these, the norbornene type polymers, vinyl alicyclic hydrocarbon polymers, hydrides thereof and the like are preferred from the viewpoints of dimensional stability, oxygen transmission rate, water vapor transmission rate, heat resistance, mechanical strength and the like.

(1) Norbornene Type Polymers

Examples of the norbornene type polymer include a ring-opening polymer of a norbornene type monomer, a ring-opening copolymer of a norbornene type monomer and other monomers capable of ring-opening copolymerizing with the norbornene type monomer and hydrogenated products thereof, an addition polymer of a norbornene type monomer, an addition copolymer of a norbornene monomer and other monomers capable of ring-opening copolymerizing with the norbornene type monomer, and the like.

In the hydrogenated product of a ring-opening polymer of a norbornene type monomer and hydrogenated product of a ring-opening copolymer of a norbornene type monomer and other monomers capable of ring-opening copolymerizing with the norbornene type monomer, when a hydrogenation rate is not less than 99%, they are excellent in transparency (particularly, initial change of yellowness index is low), stability (particularly, change of yellowness hardly occurs) and the like, and can suppress occurrence of gelation in many cases. So, such a rate is preferable.

Among these, an addition copolymer of a norbornene type monomer and other monomers capable of copolymerizing with the norbornene type monomer is the most preferable from the viewpoint that a desired retardation is easily achieved.

Examples of the norbornene type monomer include, though not restricted to, bicyclo[2.2.1]-hepto-2-ene (customary name: norbornene), 5-methyl-bicyclo[2.2.1]-hepto-2-ene, 5,5-dimethyl-bicyclo[2.2.1]-hepto-2-ene, 5-ethyl-bicyclo[2.2.1]-hepto-2-ene, 5-butyl-bicyclo[2.2.1]-hepto-2-ene, 5-hexyl-bicyclo[2.2.1]-hepto-2-ene, 5-octyl-bicyclo[2.2.1]-hepto-2-ene, 5-octadecyl-bicyclo[2.2.1]-hepto-2-ene, 5-ethylidene-bicyclo[2.2.1]-hepto-2-ene, 5-methylidene-bicyclo[2.2.1]-hepto-2-ene, 5-vinyl-bicyclo[2.2.1]-hepto-2-ene, 5-propenyl-bicyclo[2.2.1]-hepto-2-ene, 5-methoxy-carbonyl-bicyclo[2.2.1]-hepto-2-ene, 5-cyano-bicyclo[2.2.1]-hepto-2-ene, 5-methyl-5-methoxycarbonyl-bicyclo[2.2.1]-hepto-2-ene, 5-methoxycarbonyl-bicyclo[2.2.1]-hepto-2-ene, 5-ethoxycarbonyl-bicyclo[2.2.1]-hepto-2-ene, 5-methyl-5-ethoxycarbonyl-bicyclo[2.2.1]-hepto-2-ene, bicyclo[2.2.1]-hepto-5-enyl-2-methylpropionate, bicyclo[2.2.1]-hepto-5-enyl-2-methyloctanoate, bicyclo[2.2.1]-hepto-2-ene-5,6-dicarboxylic acid anhydride, 5-hydroxymethyl-bicyclo[2.2.1]-hepto-2-ene, 5,6-di(hydroxymethyl)-bicyclo[2.2.1]-hepto-2-ene, 5-hydroxy-1-propyl-bicyclo[2.2.1]-hepto-2-ene, bicyclo[2.2.1]-hepto-2-ene, 5,6-dicarboxy-bicyclo[2.2.1]-hepto-2-ene, bicyclo[2.2.1]-hepto-2-ene-5,6-dicarboxylic acid imide, 5-cyclopentyl-bicyclo[2.2.1]-hepto-2-ene, 5-cyclohexyl-bicyclo[2.2.1]-hepto-2-ene, 5-cyclohexenyl-bicyclo[2.2.1]-hepto-2-ene, 5-phenyl-bicyclo[2.2.1]-hepto-2-ene, tricyclo[4.3.1$^{2,5}$.0$^{1,6}$]-deca-3,7-diene (customary name: dicyclopentadiene), tri-cyclo[4.3.1$^{2,5}$.0$^{1,6}$]-deca-3-ene, tricyclo[4.4.1$^{2,5}$.0$^{1,6}$]-undeca-3,7-diene, tricyclo[4.4.1$^{2,5}$.0$^{1,6}$]-undeca-3.8-diene, tricyclo[4.4.1$^{2,5}$.0$^{1,6}$]-undeca-3-ene, tetracyclo[7.4.1$^{10,13}$.0$^{1,9}$.0$^{2,7}$]-trideca-2,4,6-11-tetraene (also referred to as 1,4-methano-1,4,4a,9a-tetrahydrofluorene, customary name: methanotetrahydrofluorene), tetracyclo[8,4,1$^{11,14}$,0$^{1,10}$,0$^{3,8}$]-tetradeca-3,5,7,12-11-tetraene (also referred to as 1,4-methano-1,4,4a,5,10,10a-hexahydroanthracene), tetracyclo[4.4.1$^{2,5}$.1$^{7,10}$.0]-dodeca-3-ene (also referred to as tetracyclododecene), 8-methyl-tetracyclo[4.4.1$^{2,5}$.1$^{7,10}$.0]-dodeca-3-ene, 8-methyl-tetracyclo[4.4.1$^{2,5}$.1$^{7,10}$.0]-dodeca-3-ene, 8-ethyl-tetracyclo[4.4.1$^{2,5}$.1$^{7,10}$.0]-dodeca-3-ene, 8-methylidene-tetracyclo[4.4.1$^{2,5}$.1$^{7,10}$.0]-dodeca-3-ene, 8-ethylidene-tetracyclo[4.4.1$^{2,5}$.1$^{7,10}$.0]-dodeca-3-ene, 8-vinyl-tetracyclo[4.4.1$^{2,5}$.1$^{7,10}$.0]-dodeca-3-ene, 8-propenyl-tetracyclo[4.4.1$^{2,5}$.1$^{7,10}$.0]-dodeca-3-ene, 8-methoxycarbonyl-tetracyclo[4.4.1$^{2,5}$.1$^{7,10}$.0]-dodeca-3-ene, 8-methyl-8-methoxycarbonyl-tetracyclo[4.4.1$^{2,5}$.1$^{7,10}$.0]-dodeca-3-ene, 8-hydroxymethyl-tetracyclo[4.4.1$^{2,5}$.1$^{7,10}$.0]-dodeca-3-ene, 8-carboxy-tetracyclo[4.4.1$^{2,5}$.1$^{7,10}$.0]-dodeca-3-ene, 8-cyclopentyl-tetracyclo[4.4.1$^{2,5}$.1$^{7,10}$.0]-dodeca-3-ene, 8-cyclohexyl-tetracyclo[4.4.1$^{2,5}$.1$^{7,10}$.0]-dodeca-3-ene, 8-cyclohexenyl-tetracyclo[4.4.1$^{2,5}$.1$^{7,10}$.0]-dodeca-3-ene, 8-phenyl-tetracyclo[4.4.1$^{2,5}$.1$^{7,10}$.0]-dodeca-3-ene, pentacyclo[6.5.1$^{1,8}$.1$^{3,6}$.0$^{2,7}$.0$^{9,13}$]-pentadeca-3,10-diene, pentacyclo[7.4.1$^{3,6}$.1$^{10,13}$.0$^{1,9}$.0$^{2,7}$]-pentadeca-4,11-diene and the like. These norbornene type monomers are used singly or in combination of 2 or more kinds.

The ring-opening polymer of these norbornene type monomers or the ring-opening copolymer of a norbornene type monomer and other monomers capable of ring-opening copolymerizing with the norbornene type monomer can be obtained by polymerizing the monomer component(s) in the presence of a ring-opening polymerization catalyst. As the ring-opening polymerization catalyst, there can be used, for example, a catalyst composed of a halide, nitrate or acetylacetone compound of a metal such as ruthenium, rhodium, palladium, osmium, iridium, platinum and the like, and a reducing agent, or a catalyst composed of a halide or acetylacetone compound of a metal such as titanium, vanadium, zirconium, tungsten, molybdenum and the like, and an organoaluminum compound. The polymerization reaction is usually carried out at a polymerization temperature of from −50 to 100 degrees centigrade under polymerization pressure of from 0 to 50 kg/cm$^2$ in a solvent or without using any solvent. Examples of the other monomers capable of ring-opening copolymerizing with the norbornene type monomer include, though not restricted to, a monocyclic cycloolefin based monomer such as cyclohexene, cycloheptene, cyclooctene and the like.

The hydrogenated product of a ring-opening polymer of a norbornene type monomer can be usually obtained by adding a hydrogenation catalyst to a polymerization solution of the above ring-opening polymer for adding hydrogen to carbon-carbon unsaturated bonds. The hydrogenation catalyst is not particularly limited, but heterogeneous catalysts or homogeneous catalysts are usually used.

The norbornene type monomer, or the addition (co)polymer of a norbornene type monomer and other monomers capable of copolymerizing with the norbornene type monomer can be generally obtained, for example, by (co)polymerizing the monomer component(s) at a polymerization temperature of from −50 to 100 degrees centigrade under polymerization pressure of from 0 to 50 kg/cm$^2$ in a solvent or without using any solvent in the presence of a catalyst composed of a titanium, zirconium or vanadium compound and an organoaluminum compound.

Examples of the other monomers capable of copolymerizing with the norbornene type monomer include, though not restricted to, α-olefins having 2 to 20 carbon atoms such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicocene and the like; cyclo olefins such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene and the like; and non-conjugated dienes such as 1,4-hexadiene, 4-methyl-1,4-hexadiene, 5-methyl-1,4-hexadiene, 1,7-octadiene and the like. Among these, α-olefins, particularly ethylene, are preferred.

Other monomers capable of copolymerizing with these norbornene type monomers can be used singly or in combination of 2 or more kinds. When the norbornene type monomer and other monomers capable of copolymerizing with the norbornene type monomer are subjected to an addition copolymerization, the proportion of the structural units derived from the norbornene type monomer in the addition copolymer to the structural units derived from other monomers capable of copolymerizing is properly selected such that the weight ratio is usually in the range of 30:70 to 99:1, preferably in the range of 50:50 to 97:3 and more preferably in the range of 70:30 to 95:5.

(2) Monocyclic Cycloolefin Based Polymer

As the monocyclic cycloolefin based polymer, there can be used, for example, an addition polymer of a monocyclic cycloolefin based monomer such as cyclohexene, cycloheptene, cyclooctane and the like. However, the monocyclic cycloolefin based polymer is not restricted thereto.

(3) Cyclic Conjugated Diene Type Polymer

As the cyclic conjugated diene type polymer, there can be used, for example, a polymer obtained by subjecting a cyclic conjugated diene type monomer such as cyclopentadiene, cyclohexadiene or the like to 1,2- or 1,4-addition polymerization, and hydrogenated products thereof. However, the cyclic conjugated diene type polymer is not restricted thereto.

The molecular weight of the norbornene type polymer, the monocyclic cycloolefin based polymer or the cyclic conjugated diene type polymer used in the present invention is properly selected depending on the intended application. However, when the weight average molecular weight Mw in terms of polyisoprene or polystyrene as measured in the form of a cyclohexane solution (a toluene solution in case the polymer resin is not dissolved) by the gel permeation chromatography is usually in the range of 5,000 to 1,000,000, preferably in the range of 8,000 to 800,000 and more preferably in the range of 10,000 to 500,000, the mechanical strength and molding processability of a molded product are highly balanced. Such polymers are suitable in many cases.

(4) Vinyl Alicyclic Hydrocarbon Polymer

As the vinyl alicyclic hydrocarbon polymer, there can be used, for example, a polymer of a vinyl alicyclic hydrocarbon based monomer such as vinylcyclohexene or vinylcyclohexane and hydrogenated products thereof, or hydrogenated products thereof of an aromatic ring part of a polymer of a vinyl aromatic based monomer such as styrene or α-methylstyrene. In this case, it may be any of copolymers, such as a random copolymer and a block copolymer, of a vinyl alicyclic hydrocarbon polymer and a vinyl aromatic based monomer with other monomers capable of copolymerizing with these monomers, and the like, and hydrogenated products thereof. The block copolymer is not particularly limited, and examples thereof include a diblock copolymer, a triblock copolymer, a multiblock copolymer, a tapered block copolymer and the like.

The molecular weight of the vinyl alicyclic hydrocarbon polymer used in the present invention is properly selected depending on the intended application. However, when the weight average molecular weight Mw in terms of polyisoprene or polystyrene as measured in the form of a cyclohexane solution (a toluene solution in case the polymer resin is not dissolved) by the gel permeation chromatography is usually in the range of 10,000 to 800,000, preferably in the range of 15,000 to 500,000 and more preferably in the range of 20,000 to 300,000, the mechanical strength and molding processability of a molded product are highly balanced. Such polymers are suitable in many cases.

Various additives may be added to the film as needed. Examples of such additives include various resins with a water absorption of more than 0.1% such as various cellulose resins including triacetylcellulose or antioxidants, stabilizers such as light stabilizers, ultraviolet absorbers or the like, antistatic agents and the like. However, such additives are not particularly limited as far as the object of the present invention is not impaired.

Examples of the antioxidant include a phenol based antioxidant, a phosphorus based antioxidant, a sulfur based antioxidant and the like. Among these, a phenol based antioxidant, particularly an alkyl-substituted phenol based antioxidant, is preferred. It is possible to prevent coloring or decrease in strength due to oxidative degradation without reducing transparency, heat resistance or the like by combining these antioxidants.

Examples of the ultraviolet absorber include a benzophenone based ultraviolet absorber, a benzotriazole based ultraviolet absorber and the like. Among these, 2-(2'-hydroxy-5'-methyl-phenyl)benzotriazole, 2-(2H-benzotriazole-2-yl)-4-methyl-6-(3,4,5,6-tetrahydrophthal imidylmethyl)phenol, 2-(2H-benzotriazole-2-yl)-4,6-bis(1-methyl-1-phenylethyl) phenol and the like are preferred from the viewpoints of heat resistance, low volatility and the like.

Examples of the light stabilizer include a benzophenone based light stabilizer, a benzotriazole based light stabilizer, a hindered amine based light stabilizers and the like. However, in the present invention, hindered amine based light stabilizers are preferably used form the viewpoints of transparency, coloring resistance and the like.

These antioxidants, ultraviolet absorbers, light stabilizers and the like can be used singly or in combination of 2 or more kinds. The combination amount thereof is suitably selected in the ranges in which the object of the present invention is not damaged.

Furthermore, the optical compensation film obtained as described above is heated at a temperature of lower than the glass transition temperature Tg of the film, for example, at 10 to 30 degrees centigrade, preferably at a low temperature of 10 to 20 degrees centigrade, under a reduced pressure, for example, not more than 1 Pa or in an inert gas atmosphere, for example, a nitrogen atmosphere, whereby the retardation is stabilized. So, a film which is suitable for stably compensating a viewing angle of a display element for a long period of time is obtained.

The film of the present invention is preferably used as a so-called C-plate because it compensates (enlarges) a viewing angle of a display element such as a liquid crystal display element and the like. A concrete method of using the film for compensating a viewing angle of a liquid crystal has been described in Japanese Patent Laid-open Nos. 1999-95208, 1998-506479 and the like.

Such an optical compensation film can be used for various applications. The optical compensation film of the present invention is particularly effective when used as an optical compensation sheet of a liquid crystal display device. The optical compensation film of the present invention has a characteristic such that the retardation value Rth in a thickness direction is high. So, the film itself can be used as an optical compensation sheet. The liquid crystal display device is composed of a liquid crystal cell obtained by loading a liquid crystal between two sheets of electrode substrates, two polarization elements placed at both sides thereof, and at least one optical compensation sheet between the liquid crystal cell and the polarization elements. General configuration of a liquid crystal display device will be explained with reference to FIG. 1.

FIG. 1 is a cross-sectional schematic view of a general liquid crystal display device. A liquid crystal layer 7 is placed between substrates 5a and 5b. Transparent electrode layers 6a and 6b are placed at a liquid crystal side of substrates 5a and 5b. The liquid crystal cell is composed of the aforementioned liquid crystal layer, substrates and transparent electrodes. Optical compensation sheets 4a and 4b are placed on the top and bottom of the liquid crystal cell. The optical compensation film of the present invention can be used as optical compensation sheets 4a and 4b as described above (In this example of the display device, two optical compensation sheets are used, but the optical compensation sheet of the present invention can also be used with only one sheet.). Incidentally, optical compensation sheets 4a and 4b can be a film which combines a function of protective films 2a and 2b in a liquid crystal side of polarizing films 3a and 3b, and at this time, protective films 2a and 2b in a liquid crystal side can be eliminated. On the top and bottom of the optical compensation sheets 4a and 4b, polarization elements are respectively placed and these polarization elements are composed of protective films 2a and 2b, and polarizing films 3a and 3b. On a surface of the polarization element at a display side of the liquid crystal display device, a surface treated film 1 is arranged. On the opposite side of the display surface (a side of the protective film 2b), a backlight of the liquid crystal display device is placed.

Hereinafter, the liquid crystal cell, the optical compensation sheets and the polarization elements will be described more in detail.

The liquid crystal layer of the liquid crystal cell is usually formed with a liquid crystal sealed in a space formed with spacers intervened between two substrates. The transparent electrode layer is formed on the substrate as a transparent film containing a conductive substance. On the liquid crystal cell, a gas barrier layer, a hard coat layer or (used for adhesion of the transparent electrode layer) a under coat layer may further be placed. These layers are usually placed on the substrate. The substrate of the liquid crystal cell has a thickness of usually from 80 to 500 μm.

The optical compensation sheet is a birefringence index film for eliminating coloring of a liquid crystal screen. The optical compensation film according to the present invention can be used as an optical compensation sheet. Further, it is a film for compensating (enlarging) a viewing angle of the liquid crystal display device. The thickness range of the optical compensation sheet is the same as the preferable thickness of the aforementioned optical compensation film of the present invention.

Examples of the polarizing film of the polarization element include an iodine based polarizing film, a dye based polarizing film using a dichroic dye and a polyene based polarizing film. These polarizing films can be produced, for example, by using a polyvinyl alcohol based film. The protective film of the polarization element preferably has a thickness of from 25 to 350 μm and further preferably a thickness of from 40 to 200 μm. As in the liquid crystal display device shown in FIG. 1, the surface treated film may be placed. Functions of the surface treated film include those of a hard coat film, an anti-fogging treated film, an anti-glare treated film and an anti-reflection treated film.

Incidentally, a format of the liquid crystal display device to which the optical compensation film of the present invention can be applied is not particularly limited, but the optical compensation film can be particularly preferably applied to a VA type liquid crystal display device.

A display element using the film of the present invention, particularly a liquid crystal display element, has an excellent property in a viewing angle so that contrast deterioration, gradation inversion or the like when viewed from the direction of slant is suppressed, having a highly practical value.

EXAMPLES

The present invention is now more specifically illustrated below with reference to Examples and Comparative Examples. However, the present invention is not restricted to these Examples.

In the following Examples and Comparative Examples, general properties of the films were measured in the following manner.

(Film Thickness)

The film thickness was measured using a micrometer manufactured by Mitsutoyo Corporation.

(Retardation)

Retardation values were obtained under conditions of a temperature of 23 degrees centigrade and a relative humidity of 50%, unless the measurement temperature and/or humidity were particularly shown otherwise, using a phase difference measuring device, KOBRA, manufactured by Oji Scientific Instruments. Here, the in-plane retardation value (R) was measured and obtained by a measurement with light incident on a flat surface of a sample at an incident angle of 0 degree. Further, the retardation value (Rth) in the thickness direction was obtained by an equation of $Rth=|(n_X+n_Y)/2-n_Z|\cdot d$. Here, $n_X$, $n_Y$ and $n_Z$ were obtained by computer calculation from the following equations (1) to (5) using the in-plane retardation value (R), the retardation value ($R_{40}$) measured with a slant of 40 degrees using the slow axis of the sample as an inclined axis, the film thickness (d) and the average refractive index ($n_0$) of the sample.

$$R=(n_X-n_Y)\times d \tag{1}$$

$$R_{40}=(n_X-n_Y')\times d/\cos(\phi) \tag{2}$$

$$(n_X+n_Y+n_Z)/3=n_0 \tag{3}$$

$$\phi=\sin^{-1}[\sin(40°)/n_0] \tag{4}$$

$$n_Y'=n_Y\times n_Z/[n_Y^{2'}\sin^2(\phi)+n_Z\times\cos^2(\phi)]^{1/2} \tag{5}$$

wherein, in the above equations, $n_Y'$ refers to a refractive index in the direction of Y' axis when the light axis of the incident light with the wavelength of 590 nm entering the film at the incident angle of 40 degrees is Z' axis, the axis of tilt of the film is X' axis, and an axis perpendicular to Z' axis and X' axis is Y' axis; and T refers to a refractive angle when a light at 590 nm is entering the film at the incident angle of 40 degrees.

(Glass Transition Temperature)

In accordance with the JIS K7121 method, the glass transition temperature was measured at a heating rate of 10 degrees centigrade/minute by using a nitrogen gas as an atmosphere gas according to the differential scanning calorimetry (DSC).

(Water Absorption)

A water absorption of the resin was measured in accordance with the JIS K7209 method. At first, a sample was dried at a blower type dryer set to 50 degrees centigrade for 24 hours and cooled down to room temperature in a desiccator. The resulting sample was weighed (W1), immersed in pure water in an atmosphere of 25 degrees centigrade for 24 hours, and then water was thoroughly wiped out with a dustcloth. The sample was weighed (W2). The water absorption was obtained from the weights W1 and W2 according to the following equation.

Water absorption $(\%)=(W2-W1)/W1 \times 100$

The measurement was carried out with the sample number of n=3 and an arithmetic average was taken as the water absorption of the resin.

(Photo-Elastic Coefficient)

A sample piece having a thickness of 1 mm was prepared and this sample piece was used to measure the photo-elastic coefficient using a dynamic birefringence measuring equipment under conditions as described in Journal of The Society of Rheology, Japan, Vol. 19, p. 93 (1991).

Example 1

A random copolymer of tetracyclo[$4.4.1^{2,5}.1^{7,10}.0$]-dodeca-3-ene (TCD-3) of the following formula and ethylene (mole ratio of TCD-3 to ethylene=35:65, glass transition temperature: 145 degrees centigrade, average refractive index: 1.54, water absorption: 0.01%, molecular weights in terms of polystyrene Mw: $1.1 \times 10^5$ and Mn: $5.4 \times 10^4$) was used as an addition copolymer of a norbornene type monomer and an olefin based monomer for melt-extrusion and molding by the use of a single screw extruder (diameter: 40 mm) under the condition of a cylinder temperature of 260 degrees centigrade to prepare a film having the film thickness of 140 μm. Subsequently, this film was stretched in the transverse direction (TD direction) of the film at a temperature of 160 degrees centigrade at a stretch ratio of two times using a stretching machine to prepare a uniaxially stretched film having a film thickness of 71 μm. The in-plane retardation value (R), the retardation value (Rth) in the thickness direction and Rth/R of the obtained uniaxially stretched film at a wavelength of 590 nm are shown in Table 1.

[Chemical Formula 1]

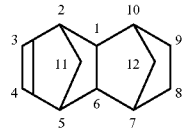

Example 2

A random copolymer of tetracyclo[$4.4.1^{2,5}.1^{7,10}.0$]-dodeca-3-ene (TCD-3) and ethylene (mole ratio of TCD-3 to ethylene=35:65, glass transition temperature: 145 degrees centigrade, average refractive index: 1.54, water absorption: 0.01%, molecular weights in terms of polystyrene Mw: $1.1 \times 10^5$ and Mn: $5.4 \times 10^4$) was used as an addition copolymer of a norbornene type monomer and an olefin based monomer for melt-extrusion and molding by the use of a single screw extruder (diameter: 40 mm) under the condition of a cylinder temperature of 260 degrees centigrade to prepare a film having a film thickness of 140 μm. Subsequently, this film was stretched in the transverse direction (TD direction) of the film at a temperature of 160 degrees centigrade at a stretch ratio of three times using a stretching machine to prepare a uniaxially stretched film having a film thickness of 51 μm. The in-plane retardation value (R), the retardation value (Rth) in the thickness direction and Rth/R of the obtained uniaxially stretched film at a wavelength of 590 nm are shown in Table 1.

Example 3

A random copolymer of tetracyclo[$4.4.1^{2,5}.1^{7,10}.0$]-dodeca-3-ene (TCD-3) and ethylene (mole ratio of TCD-3 to ethylene=35:65, glass transition temperature: 145 degrees centigrade, average refractive index: 1.54, water absorption: 0.01%, molecular weights in terms of polystyrene Mw: $1.1 \times 10^5$ and Mn: $5.4 \times 10^4$) was used as an addition copolymer of a norbornene type monomer and an olefin based monomer for melt-extrusion and molding by the use of a single screw extruder (diameter: 40 mm) under the condition of a cylinder temperature of 260 degrees centigrade to prepare a film having a film thickness of 140 μm. Subsequently, this film was stretched in the machine direction (MD direction) of the film at a temperature of 160 degrees centigrade at a stretch ratio of two times and in the transverse direction (TD direction) of the film at a stretch ratio of two times using a biaxial stretching machine to prepare a biaxially stretched film having a film thickness of 35 μm. The in-plane retardation value (R), the retardation value (Rth) in the thickness direction and Rth/R of the obtained biaxially stretched film at a wavelength of 590 nm are shown in Table 1.

Example 4

A random copolymer of tetracyclo[$4.4.1^{2,5}.1^{7,10}.0$]-dodeca-3-ene (TCD-3) and ethylene (mole ratio of TCD-3 to ethylene=35:65, glass transition temperature: 145 degrees centigrade, average refractive index: 1.54, water absorption: 0.01%, molecular weights in terms of polystyrene Mw: $1.1 \times 10^5$ and Mn: $5.4 \times 10^4$) was used as an addition copolymer of a norbornene type monomer and an olefin based monomer for melt-extrusion and molding by the use of a single screw extruder (diameter: 40 mm) under the condition of a cylinder temperature of 260 degrees centigrade to prepare a film having a film thickness of 140 μm. Subsequently, this film was stretched in the machine direction (MD direction) of the film at a temperature of 160 degrees centigrade at a stretch ratio of 2.5 times and in the transverse direction (TD direction) of the film at a stretch ratio of 2.5 times using a biaxial stretching machine to prepare a biaxially stretched film having a film thickness of 24 μm. The in-plane retardation value (R), the retardation value (Rth) in the thickness direction and Rth/R of the obtained biaxially stretched film at a wavelength of 590 nm are shown in Table 1.

Comparative Example 1

An ARTON Film (glass transition temperature: 167 degrees centigrade, film thickness: 100 μm, R=4.1 nm, Rth=44.6 nm, water absorption: 0.42%), which is a solvent cast film of a norbornene type polymer manufactured by Japan Synthetic Rubber Co., Ltd., was stretched in the transverse direction (TD direction) of the film at a temperature of 182 degrees centigrade by the use of a stretching machine at a stretch ratio of two times to prepare a uniaxially stretched film having a thickness of 51 μm. The in-plane retardation value (R), the retardation value (Rth) in the thickness direction and Rth/R of the obtained uniaxially stretched film at a wavelength of 590 nm are shown in Table 1.

Comparative Example 2

A ZEONOR Film (grade: ZF14, glass transition temperature: 136 degrees centigrade, film thickness: 100 μm, R=6.2 nm, Rth=8.0 nm, water absorption: 0.02%), which is a melt extruded film of a norbornene type polymer manufactured by Zeon Corporation, was stretched in the transverse direction (TD direction) of the film at a temperature of 151 degrees centigrade at a stretch ratio of three times to prepare a uniaxially stretched film having a thickness of 35 μm. The in-plane retardation value (R), the retardation value (Rth) in the thickness direction and Rth/R of the obtained uniaxially stretched film at a wavelength of 590 nm are shown in Table 1.

Comparative Example 3

A polycarbonate resin (glass transition temperature: 149 degrees centigrade, average refractive index: 1.59, water absorption: 0.56%) was used for melt-extrusion and molding by the use of a single screw extruder (diameter: 40 mm) under the condition of a cylinder temperature of 300 degrees centigrade to prepare a film having a film thickness of 160 μm. Subsequently, this film was stretched in the machine direction (MD direction) of the film at a temperature of 164 degrees centigrade at a stretch ratio of two times and in the transverse direction (TD direction) of the film at a stretch ratio of two times using a biaxial stretching machine to prepare a biaxially stretched film having a film thickness of 45 μm. The in-plane retardation value (R), the retardation value (Rth) in the thickness direction and Rth/R of the obtained biaxially stretched film at a wavelength of 590 nm are shown in Table 1.

TABLE 1

| | Stretch ratio | Film thickness (μm) | Photo-elastic coefficient ($\times 10^{-9}$ $Pa^{-1}$) | R (nm) | Rth (nm) | Rth/R |
|---|---|---|---|---|---|---|
| Example 1 | 2 times | 71 | 0.3 | 2.0 | 17.3 | 8.7 |
| Example 2 | 3 times | 51 | 0.3 | 4.8 | 31.5 | 6.6 |
| Example 3 | 2 × 2 | 35 | 0.3 | 0.4 | 29.2 | 73.0 |
| Example 4 | 2.5 × 2.5 | 24 | 0.3 | 0.3 | 36.7 | 122.3 |
| Comparative Example 1 | 2 times | 51 | 2.0 | 96.4 | 114.8 | 1.2 |
| Comparative Example 2 | 3 times | 35 | 1.2 | 58.0 | 74.2 | 1.3 |
| Comparative Example 3 | 2 × 2 | 45 | 4.7 | 23.6 | 75.5 | 3.2 |

Comparative Example 4

A TAC Film (film thickness: 80 μm), which is a solvent cast film of a cellulose type polymer with a water absorption of 1.2% manufactured by Fujifilm Corporation, was measured while changing the temperature and relative humidity in an environment laboratory. As a result, a correlation between R and Rth values, and a relative humidity was found. At a relative humidity of 30%, R was 7.5 nm and Rth was 72.4 nm (Rth/R=9.7). As soon as the relative humidity was increased, R and Rth values were decreased. At a relative humidity of 50%, R was decreased to 4.6 nm and Rth was decreased to 53.6 nm (Rth/R=11.7). Such a big change of about 25 to 40% is not preferable as an optical film.

Example 5

The film with a water absorption of 0.01% in Example 1 was tested in the same manner as in Comparative Example 4. But, a correlation between the R and Rth values, and the temperature and the relative humidity was not found. Further, the maximum change in the R and Rth values was within 10%, which was not a problematic level in consideration of measurement errors.

Example 6

A random copolymer of tetracyclo[$4.4.1^{2,5}.1^{7,10}.0$]-dodeca-3-ene (TCD-3) and ethylene (mole ratio=30:70, glass transition temperature: 124 degrees centigrade, average refractive index: 1.54, water absorption: 0.01%, molecular weights in terms of polystyrene Mw: $1.2\times10^5$ and Mn: $5.6\times10^4$) was used as an addition copolymer of a norbornene type monomer and an olefin based monomer for melt-extrusion and molding by the use of a single screw extruder (diameter: 40 mm) under the condition of a cylinder temperature of 240 degrees centigrade to prepare a film having a film thickness of 400 μm. Subsequently, this film was stretched in the machine direction (MD direction) of the film at a temperature of 140 degrees centigrade at a stretch ratio of about two times and in the transverse direction (TD direction) of the film at a stretch ratio of about two times using a stretching machine to prepare a biaxially stretched film having a film thickness of 100 μm.

The above film was heated from 30 to 200 degrees centigrade and maintained at 200 degrees centigrade for an hour while the weight was measured to carry out a thermogravimetric analysis. As a result, the weight loss before and after temperature elevation was not observed. Measurement results of the retardations in the plane and in the thickness direction, and the photo-elastic coefficient are shown in Table 2.

Comparative Example 5

As a ring-opening polymer of a norbornene type monomer, a resin (glass transition temperature: 168 degrees centigrade, average refractive index: 1.51, water absorption: 0.40%, molecular weights in terms of polystyrene Mw: $9.2\times10^4$ and Mn: $4.4\times10^4$) obtained by hydrogenating a ring-opening copolymer of 8-methyl-8-methoxycarbonyltetracyclo[$4.4.0.1^{2,5}.1^{7,10}$] dodeca-3-ene with a palladium/silica magnesia catalyst was dissolved in a toluene solution to prepare a film having a film thickness of 90 μm by a solvent casting method. Subsequently, this film was stretched in the machine direction (MD direction) of the film at a temperature of 180 degrees centigrade at a stretch ratio of about 1.5 times and in the transverse direction (TD direction) of the film at a stretch ratio of about 1.5 times using a stretching machine to prepare a biaxially stretched film having a film thickness of 40 μm.

The above film was subjected to a thermogravimetric analysis and as a result, the weight loss of 8.1% was observed. Further, a desorbed gas was collected and identified by GC-MS and, as a result, monomer, oligomer, toluene, water and the like were observed. Measurement results of the retardations in the plane and in the thickness direction, and the photo-elastic coefficient are shown in Table 2.

Example 7

The film having a film thickness of 40 μm prepared in Comparative Example 5 was further vacuum-dried at Tg−20 degrees centigrade for 7 days. The above film was further allowed to stand at a constant temperature/humidity chamber at 23 degrees centigrade and 50%, and then a thermogravimetric analysis was carried out. As a result, the weight loss of 0.2% was observed. A desorbed gas was collected and identified by GC-MS and, as a result, water was mostly observed. Measurement results of the retardations in the plane and in the thickness direction, and the photo-elastic coefficient are shown in Table 2.

Example 8

The same addition copolymer of a norbornene type monomer and an olefin based monomer as that used in Example 6 was dissolved in a cyclohexane solution to prepare a film having a film thickness of 400 μm by a solvent casting method. Subsequently, the film was stretched in the machine direction (MD direction) of the film at a temperature of 140 degrees centigrade at a stretch ratio of two times and in the transverse direction (TD direction) of the film at a stretch ratio of two times using a stretching machine to prepare a biaxially stretched film having a film thickness of 41 μM.

The above film was heated from 30 to 200 degrees centigrade and maintained at 200 degrees centigrade for an hour and then its weight was measured. As a result, the weight loss of 6.5% between before and after the temperature elevation was observed. Further, a desorbed gas was collected and identified by GC-MS and, as a result, TCD-3 that is a monomer, ethylene, oligomer, cyclohexane and the like were observed. Measurement results of the retardations in the plane and in the thickness direction, and the photo-elastic coefficient are shown in Table 2.

(Evaluation of an Optical Compensation Film)

(1)

The films prepared in Comparative Example 5, Examples 6, 7 and 8 were assembled into commercially available liquid crystal displays and a continuous switching test was carried out at an environment temperature of 60 degrees centigrade for 240 hours. The change in the contrast and the color tone before and after the test were observed. The results thereof are shown in Table 2.

In the Table, [left-hand side] refers to a value of the left-hand side in Formula 1 (β (photo-elastic coefficient)×2.5× $10^5$+L (weight loss)×2.5×$10^{-4}$) in the specification, which was calculated from the measured photo-elastic coefficient and weight loss.

As shown in the following results, the optical compensation films in the Examples are suitable for the use in liquid crystal displays, especially an optical compensation films satisfying conditions in Expression 1 (those in Examples 6 and 7) maintain its performance at a relatively high temperature over a long period of time and can be particularly suitably used for actual liquid crystal displays.

TABLE 2

| | Photo-elastic coefficient | R (nm) | Rth (nm) | Rth/R | Weight loss (kg/kg) | Left-hand side | Contrast, change in color tone |
|---|---|---|---|---|---|---|---|
| Example 6 | $0.3 \times 10^{-9}$ | 0.3 | 32.5 | 108.3 | 0 | 0.00008 | ◎ (no change) |
| Comparative Example 5 | $1.8 \times 10^{-9}$ | 8.3 | 36.5 | 4.4 | 0.084 | 0.00255 | X (big change) |
| Example 7 | $1.8 \times 10^{-9}$ | 9.0 | 50.5 | 5.6 | 0.002 | 0.00050 | ○ (a little change) |
| Example 8 | $0.3 \times 10^{-9}$ | 0.2 | 30.1 | 150.5 | 0.065 | 0.00170 | X (big change) |

(2)

Further, the films in Examples 1 to 5 were used and applied to the liquid crystal display devices. As a result, a viewing angle was enlarged as compared to films in Comparative Examples 1 to 4 applied to the liquid crystal display devices. Accordingly, it was confirmed that the optical compensation films of the present invention compensate the viewing angle when it was applied to the liquid crystal display device.

(3)

The films prepared in Examples 1 to 4 and Comparative Examples 1 to 3 were respectively allowed to stand under the environments of 23 degrees centigrade and a relative humidity of 50%, and 23 degrees centigrade and a relative humidity of 30% for 24 hours or more. Rths under each environment were respectively taken as Rth2 and Rth1, and then the films were assembled into commercially available liquid crystal displays to observe the change in the contrast and the color tone due to the above environment difference. The results thereof are shown in Table 3.

TABLE 3

| | Rth2 | Rth1 | Rth2/Rth1 | Contrast, Change in color tone |
|---|---|---|---|---|
| Example 1 | 17.3 | 17.1 | 1.01 | ◎ (no change) |
| Example 2 | 31.5 | 31.2 | 1.01 | ◎ (no change) |
| Example 3 | 29.2 | 29.3 | 1.00 | ◎ (no change) |
| Example 4 | 36.7 | 37.1 | 0.99 | ◎ (no change) |
| Comparative Example 1 | 114.8 | 103.7 | 1.11 | x (big change) |
| Comparative Example 2 | 74.2 | 74.6 | 0.99 | ◎ (no change) |
| Comparative Example 3 | 75.5 | 64.4 | 1.17 | x (big change) |

According to Table 3, in Examples 1 to 4, the change of Rth values by the relative humidity was within 10%, while the change in Comparative Examples 1 and 3 was more than 10%. Further, in Examples 1 to 4, the change in the contrast and the color tone when assembled into a liquid crystal display were not observed, and the results were considered to be good. On the other hand, in Comparative Examples 1 and 3, the changes were significant.

As described above, the embodiments of the present invention were described, but the present invention is not restricted thereto, and can have various embodiments. Embodiments will be listed below.

(1) a film that is obtainable according to a melting method when a direction wherein a refractive index within the film surface is maximum is an X axis, a direction vertical to the X axis within the surface is a Y axis, a film thickness direction is a Z axis, refractive indexes at a wavelength of 590 nm in each axis direction are $n_X$, $n_Y$, $n_Z$, and a film thickness is d (nm), wherein a retardation value within the surface expressed as $R=(n_X-n_Y)\cdot d$ and a thickness direction retardation value expressed as $Rth=\{(n_X+n_Y)/2-n_Z\}\cdot d$ satisfy inequalities of $Rth/R \geq 5$ and $R \leq 10$ (nm);

(2) the film as set forth in the above item (1) prepared by uniaxial stretching or biaxial stretching;

(3) the film as set forth in the above item (1) or (2) composed of a resin with a water absorption of not more than 0.1%;

(4) the film as set forth in the above item (3), wherein the resin with a water absorption of not more than 0.1% is an alicyclic structure-containing polymer;

(5) the film as set forth in the above item (4), wherein the above alicyclic structure-containing polymer is a saturated thermoplastic norbornene type resin selected from the group consisting of hydrogenated products of a ring-opening (co) polymer of a norbornene type monomer with a hydrogen rate of not less than 99%, and an addition copolymer of a norbornene type monomer and an olefin-based monomer;

(6) the film as set forth in any one of the above items (3) to (5), wherein a photo-elastic coefficient of the resin with a water absorption of not more than 0.1% is not more than $1.0 \times 10^{-9}$ $Pa^{-1}$;

(7) the film as set forth in any one of the above items (3) to (6), wherein a glass transition temperature Tg of the resin with a water absorption of not more than 0.1% is not less than 100 degrees centigrade;

(8) a method for compensating a viewing angle of a display element using the film as set forth in any one of the above items (1) to (7);

(9) a display element using the film as set forth in any one of the above items (1) to (7); and

(10) a liquid crystal display element using the film as set forth in any one of the above items (1) to (7).

The invention claimed is:

1. An optical compensation film obtainable according to a melting method by use of a resin of an addition copolymer of a norbornene monomer and an olefin monomer, wherein, when a direction that gives the maximum in-plane refractive index is X axis, an in-plane direction perpendicular to X axis is Y axis, a film thickness direction is Z axis, refractive indexes at the wavelength of 590 nm in each axis direction are $n_X$, $n_Y$, and $n_Z$ respectively, and the film thickness is d, an in-plane retardation value defined as $R=(n_X-n_Y)\cdot d$ and a thickness direction retardation value defined as $Rth=|(n_X+n_Y)/2-n_Z|\cdot d$, both of which are measured under conditions at 23 degrees centigrade and a relative humidity of 50%, satisfy the inequalities of $Rth/R \geq 5$ and $R \leq 9.5$ (nm); and
wherein a water absorption of said resin is not more than 0.1%.

2. The optical compensation film as set forth in claim 1, wherein the said in-plane retardation value R satisfies the inequality of $R \leq 8$ (nm).

3. The optical compensation film as set forth in claim 1, wherein the photo-elastic coefficient of the resin constituting at least a part of the said film is not more than $1.0 \times 10^{-9}$ $Pa^{-1}$.

4. The optical compensation film as set forth in claim 1, wherein the photo-elastic coefficient $\beta$ ($Pa^{-1}$) of the resin constituting at least a part of the said film and the weight loss L (%) when the said film is heated from 30 to 200 degrees centigrade and maintained for an hour satisfy the inequality of $\beta \times 2.5 \times 10^5 + L \times 2.5 \times 10^{-4} \leq 1 \times 10^{-3}$ (Formula 1).

5. The optical compensation film as set forth in claim 1, wherein the glass transition temperature (Tg) of the resin constituting at least a part of the said film is not less than 100 degrees centigrade.

6. The optical compensation film as set forth in claim 1, wherein $Rth_2/Rth_1$ satisfy the inequality of $0.9 \leq Rth_2/Rth_1 \leq 1.1$, when said $Rth_1$ represents the Rth value at a relative humidity of 30% and said $Rth_2$ represents the Rth value at a relative humidity of 50%.

7. The optical compensation film as set forth in claim 1, wherein the said film is prepared by uniaxial stretching or biaxial stretching.

8. A method for compensating a viewing angle of a display element using the optical compensation film as set forth in claim 1.

9. A display element using the film as set forth in claim 1.

10. A liquid crystal display element using the film as set forth in claim 1.

11. The optical compensation film as set forth in claim 1, wherein said addition copolymer is an addition copolymer of tetracyclo[$4.4.1^{2,5}.1^{7,10}$.0]-dodeca-3-ene and ethylene.

12. The optical compensation film as set forth in claim 1, the content of said resin with a water absorption of not more than 0.1% in said film is from 50 to 100 weight %.

13. An optical compensation film comprising a resin of an addition copolymer of a norbornene monomer and an olefin monomer, wherein, when a direction that gives the maximum in-plane refractive index is X axis, an in-plane direction perpendicular to X axis is Y axis, a film thickness direction is Z axis, refractive indexes at the wavelength of 590 nm in each axis direction are $n_X$, $n_Y$, and $n_Z$ respectively, and the film thickness is d, an in-plane retardation value defined as $R=(n_X-n_Y)\cdot d$ and a thickness direction retardation value defined as $Rth=|(n_X+n_Y)/2-n_Z|\cdot d$, both of which are measured under conditions at 23 degrees centigrade and a relative humidity of 50%, satisfy the inequalities of $Rth/R \geq 5$ and $R \leq 7.5$ (nm); and
wherein a water absorption of said resin is not more than 0.1%.

14. The optical compensation film as set forth in claim 13, wherein the photo-elastic coefficient of the resin constituting at least a part of the said film is not more than $1.0 \times 10^{-9}$ $Pa^{-1}$.

15. The optical compensation film as set forth in claim 13, wherein the photo-elastic coefficient $\beta$ ($Pa^{-1}$) of the resin constituting at least a part of the said film and the weight loss L (%) when the said film is heated from 30 to 200 degrees centigrade and maintained for an hour satisfy the inequality of $\beta \times 2.5 \times 10^5 + L \times 2.5 \times 10^{-4} \leq 1 \times 10^{-3}$ (Formula 1).

16. The optical compensation film as set forth in claim 13, wherein the glass transition temperature (Tg) of the resin constituting at least a part of the said film is not less than 100 degrees centigrade.

17. The optical compensation film as set forth in claim 13, wherein $Rth_2/Rth_1$ satisfy the inequality of $0.9 \leq Rth_2/Rth_1 \leq 1.1$, when said $Rth_1$ represents the Rth value at a relative humidity of 30% and said $Rth_2$ represents the Rth value at a relative humidity of 50%.

18. The optical compensation film as set forth in claim 13, wherein the said film is prepared by uniaxial stretching or biaxial stretching.

19. A method for compensating a viewing angle of a display element using the optical compensation film as set forth in claim 13.

20. A display element using the film as set forth in claim 13.

21. A liquid crystal display element using the film as set forth in claim 13.

22. The optical compensation film as set forth in claim 13, wherein said addition copolymer is an addition copolymer of tetracyclo$[4.4.1^{2,5}.1^{7,10}.0]$-dodeca-3-ene and ethylene.

23. The optical compensation film as set forth in claim 13, the content of said resin with a water absorption of not more than 0.1% in said film is from 50 to 100 weight %.

* * * * *